United States Patent [19]

Takagishi

[11] Patent Number: 5,183,886

[45] Date of Patent: Feb. 2, 1993

[54] PROCESS FOR PREPARATION OF CRYSTALLINE OXYTITANIUM PHTHALOCYANINE SHOWING A,B OR C FORM

[75] Inventor: Iwao Takagishi, Yokohama, Japan

[73] Assignee: Mitsubishi Kasei Corporation, Tokyo, Japan

[21] Appl. No.: 888,246

[22] Filed: May 22, 1992

Related U.S. Application Data

[63] Continuation of Ser. No. 526,585, May 21, 1990, abandoned.

[30] Foreign Application Priority Data

| May 22, 1989 | [JP] | Japan | 1-128426 |
| Jul. 18, 1989 | [JP] | Japan | 1-185075 |
| Jul. 27, 1989 | [JP] | Japan | 1-194815 |

[51] Int. Cl.⁵ .............................. C09B 67/50
[52] U.S. Cl. .................. 540/141; 540/142; 540/143
[58] Field of Search ........................ 540/141

[56] References Cited

U.S. PATENT DOCUMENTS

| 4,664,997 | 5/1987 | Suzuki et al. | 430/58 |
| 4,725,519 | 2/1988 | Suzuki et al. | 430/58 |
| 4,775,251 | 10/1988 | Tanaka et al. | 540/143 |
| 4,777,251 | 10/1988 | Tanaka et al. | 540/143 |
| 4,777,257 | 10/1988 | Kanao | 546/342 |

FOREIGN PATENT DOCUMENTS

| 61-217050 | 9/1986 | Japan. |
| 62-256866 | 11/1987 | Japan. |
| 62-256867 | 11/1987 | Japan. |
| 63-366 | 1/1988 | Japan. |
| 63-000366 | 1/1988 | Japan. |
| 63-20365 | 1/1988 | Japan. |

OTHER PUBLICATIONS

CA:108 (16): 133405f (1988).
CA 108 (16): 133406g (1988).
CA 108 (16): 133407h (1988).

*Primary Examiner*—Robert T. Bond
*Assistant Examiner*—Jyoihsna Venkat
*Attorney, Agent, or Firm*—David G. Conlin; Linda M. Buckley; Peter F. Corless

[57] ABSTRACT

A process for the preparation of crystalline oxytitanium phthalocyanine comprising contacting dichlorotitanium phthalocyanine, dibromotitanium phthalocyanine or a mixture of them with at least one organic solvent selected from the group consisting of aromatic nitro compounds, nitrogen-containing cyclic ethers, aromatic amines, alcohols containing not less than 4 carbon atoms, aldehydes, ketones, lactones, lactams, acid amides, nitriles, alkyl sulfoxides, substituted phenols and non-substituted phenols in association with water.

14 Claims, 5 Drawing Sheets

PROCESS FOR PREPARATION OF CRYSTALLINE OXYTITANIUM PHTHALOCYANINE SHOWING A,B OR C FORM

This is a continuation of copending application Ser. No. 07/526,585 filed on May 21, 1990 now abandoned.

BACKGROUND OF THE INVENTION

1. Field of the Invention

This invention relates to a process for the preparation of oxytitanium phthalocyanine (abbreviated as "TiOPc" hereinafter). More precisely, it relates to a process for the preparation of crystalline TiOPc using dichlorotitanium phthalocyanine and/or dibromotitanium phthalocyanine as a starting material.

2. Description of the Prior Art

Phthalocyanines have been well known as a useful material for the electronic industry as well as a coloring material for paint, printing ink, resin material and the like, and they are widely used as a material for electrophotographic photoreceptor.

During our investigation of preparation methods of TiOPc, we found TiOPc showing major diffraction peaks at Bragg angles ($2\theta\pm0.2°$) of 9.3°, 10.6°, 13.2°, 15.2°, 20.8° and 26.3° (designated as "A-type TiOPc" hereinafter), TiOPc showing major diffraction peaks at Bragg angles ($2\theta\pm0.2°$) of 7.6°, 10.2°, 22.3°, 25.3° and 28.6° (designated as "B-type TiOPc" hereinafter) and TiOPc showing major diffraction peaks at Bragg angles ($2\theta\pm0.2°$) of 7.0°, 15.6°, 23.4° and 25.6° (designated as "C-type TiOPc" hereinafter) in their X-ray diffraction spectra and proposed the production methods for those TiOPc's (Japanese Patent Application Laying-open Nos. 62-256865, 62-256867 and 63-366).

However, those prior methods require precise adjustments of the parameters such as the temperature elevation rate during the reaction of o-phthalodinitrile and titanium tetrachloride and the filtration temperature after the reaction, and the products of those methods tend to contain two or more TiOPc crystalline forms.

Japanese Patent Application Laying-open No. 61-217050 discloses a method for the preparation of TiOPc wherein dichlorotitanium phthalocyanine (abbreviated as "TiCl$_2$Pc" hereinafter) is heated with concentrated aqueous ammonia and washed with acetone to obtain TiOPc. However, the product of this method also tends to contain the both of A-type and B-type crystals of TiOPc, and it requires laborious operation.

Further, this prior method involves further drawbacks because of the use of TiCl$_2$Pc as the starting material. That is, TiCl$_2$Pc is produced by a condensation reaction, of o-phthalodinitrile and titanium chloride and a hydrolysis of the condensation product with water or aqueous ammonia according to the following scheme;

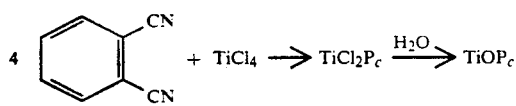

however, the hydrolysis of this process requires a lot of time and the crystallinity of the produced TiOPc is relatively low. Therefore, the prior methods using TiCl$_2$Pc such as described above are extremely time-consuming and usually require a further physical or chemical treatment such as a treatment with N-methylpyrrolidone, acetone and the like.

On the other hand, a method for the production of TiOPc showing a specific crystalline form by means of a physical treatment had been also proposed in Japanese Patent Application Laying-open No. 64-17066. This patent document discloses a method for the production of TiOPc showing the most distinct diffraction peak at a Bragg angle ($2\theta\pm0.2°$) of 27.3° and other peaks at 9.7° and 24.1° (designated as "D-type TiOPc" hereinafter), wherein TiOPc is ground with polyethylene glycol by means of a sand grinder and then treated with diluted sulfuric acid to cause a crystalline transition. However, this method also requires precise adjustments of the conditions such as the agitating conditions during the grinding, and the product also tend to contain two crystalline forms of TiOPc.

The object of the present invention is, therefore, to provide a novel method capable of eliminating the drawbacks of the prior methods described above and selectively producing TiOPc showing a specific crystalline form of A, B, C or D-type.

SUMMARY OF THE INVENTION

Surprisingly, it was found that TiOPc could be easily prepared from TiCl$_2$Pc and/or dibromotitanium phthalocyanine (abbreviated as "TiBr$_2$Pc" hereinafter) in a manner different from the well-known hydrolysis method.

Therefore, the present invention is a process for the preparation of crystalline oxytitanium phthalocyanine comprising contacting TiCl$_2$Pc and/or TiBr$_2$Pc with at least one organic solvent selected from the group consisting of aromatic nitro compounds, nitrogen-containing cyclic ethers, aromatic amines, alcohols containing not less than 4 carbon atoms, aldehydes, ketones, lactones, lactams, acid amides, nitriles, alkyl sulfoxides, substituted phenols and non-substituted phenols in association with water.

According to the process of the invention, crystalline TiOPc showing a desired crystalline form of A, B, C or D-type can be selectively and easily produced by suitably selecting the organic solvent to be contacted with TiCl$_2$Pc and/or TiBr$_2$Pc. The TiOPc prepared according to the present invention does not contain undesired contaminative crystalline form, which is usually found in the TiOPc obtained by any of the prior processes. Further, the TiOPc obtained by the present invention has a sufficient degree of crystallinity for any practical use as it is, though it may be of course further purified by treating with a solvent such as water, methanol, acetone, N-methylpyrrolidone, dimethyl sulfoxide and N,N-dimethylformamide.

DETAILED DESCRIPTION OF THE INVENTION

Figure 1:
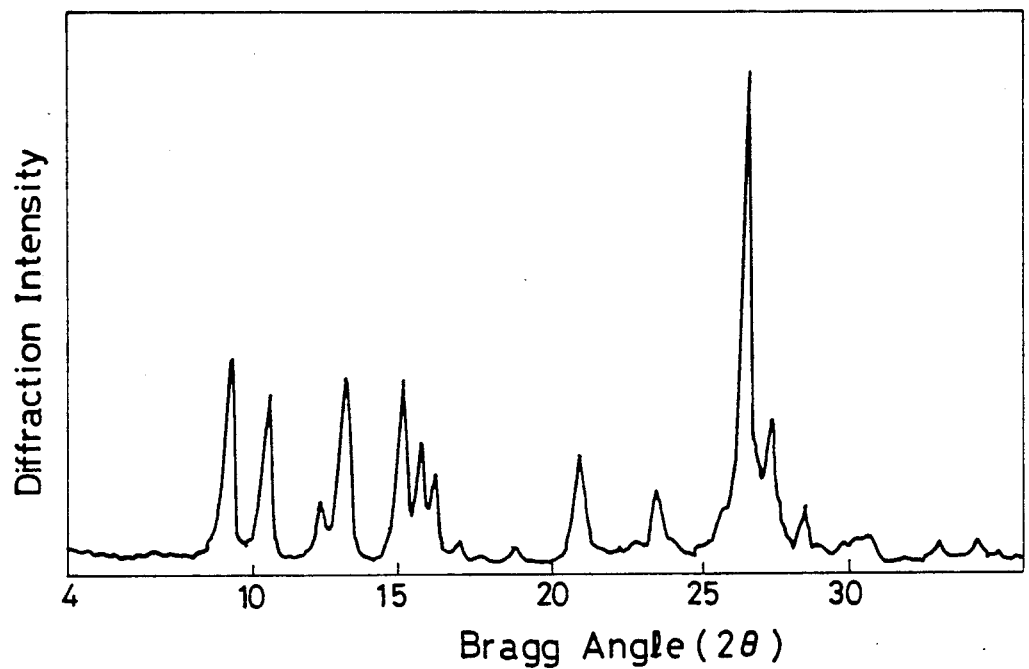
FIGS. 1 to 4 are the X-ray diffraction spectra obtained for the crystalline TiOPc's in powder form produced in Examples 1, 2, 3 and 27, respectively.

The organic solvents used for the present invention include aromatic nitro compounds, nitrogen-containing cyclic ethers, aromatic amines, alcohols containing not less than 4 carbon atoms, aldehydes, ketones, lactones, lactams, acid amides, nitriles, alkyl sulfoxides, substituted phenols and non-substituted phenols.

The "non-substituted phenol" according to the invention means mono- or polyfunctional phenols having no substituent other than hydroxyl group(s) on the benzene ring such as phenol, catechol, resorcin, hydroquinone and pyrogallol. The "substituted phenols" means phenols having one or more substituents such as alkyl group and amino group on the benzene ring.

The organic solvent may be either in liquid form or in solid form at the atmospheric temperature so long as it can take liquid form when it is contacted with $TiCl_2Pc$ and/or $TiBr_2Pc$. When a solvent having a high melting point such as phenols is used, it may be melted or mixed with up to 80%, preferably up to 70% of an inert solvent having a low melting point which may be selected from ethers, esters, hydrocarbons and the like to improve the treatability thereof.

The solvents producing A-type and B-type of TiOPc are classified in Tables 1 and 2 below, though there may be some exceptions for each of the solvents generically mentioned.

TABLE 1

| Organic solvents producing A-type TiOPc | |
|---|---|
| Type of Solvent | Specific Examples |
| N-Alkyllactams | N-Methylpyrrolidone, N,N-dimethylimidazolidine-2-one |
| Aromatic nitro compounds | Nitrobenzene, 1,4-dinitrobenzene |
| Halogenated phenols | 4-Chlorophenol, 2-bromophenol |
| Acid amides containing aromatic ring | N-Methylformanilide, N-phenylformanilide |
| Nitrogen-containing cyclic ethers | Morpholine |
| Aromatic primary amines | Aniline, 1,4-diaminobenezene |

TABLE 2

| Organic solvents producing B-type TiOPc | |
|---|---|
| Type of Solvent | Specific Examples |
| Alcohols containing not less than 4 carbon atoms | Butanol, pentanol, hexanol, heptanol, octanol, cyclopentanol, cyclohexanol, benzyl alcohol, $\beta$-phenylethyl alcohol |
| Aldehydes | n-Butyl aldehyde, p-butoxybenzaldehyde |
| Ketones | Acetonylacetone, cyclohexanone, acetophenone |
| Lactones | $\gamma$-Butyrolactone |
| Lactams (other than N-alkyllactams) | $\epsilon$-Caprolactam |
| Non-aromatic acid amides | N,N-Dimethylformamide, N,N-dimethylacetamide |
| Substituted phenols (other than halogenated phenols) | p-Methoxyphenol, p-aminophenol, p-tert-octylphenol, bisphenol A |
| Nitriles | Malononitrile |
| N-Alkyl substituted anilines | N-Ethylaniline |
| Alkyl sulfoxides | Dimethyl sulfoxide |

The solvents giving C-type TiOPc include 2,5-xylenol.

For obtaining D-type TiOPc, the non-substituted phenols are used in association with water.

The conditions for the contact of the organic solvent with $TiCl_2Pc$ and/or $TiBr_2Pc$ are not particularly limited insofar as the TiOPc crystals may be produced.

The temperature for the contact may be selected freely; however, it is generally selected from the rage of 50° to 200° C. From the viewpoint of the process efficiency, it is desirable that the temperature is as high as possible since the higher temperature gives higher production rate of TiOPc. Therefore, it is advantageous to select a solvent having a high boiling point.

The duration of the contact may vary depending on the crystalline type to be produced, the amount of the solvent and the temperature. For example, when the temperature is 130° C., the contact is generally carried out for 1 to 3 hours.

The weight ratio of $TiCl_2Pc$ and/or $TiBr_2Pc$ to the solvent is not particularly limited; however, it is preferably selected from the range of 1:5 to 1:100 from the viewpoint of the efficiency of the contact and the treatability of the mixture. Too small amount of the organic solvent would give a poor contact efficiency and thereby resulting a low production rate of TiOPc.

The method for the contact of $TiCl_2Pc$ and/or $TiBr_2Pc$ with the organic solvent is not also particularly limited, and it may be carried out by any method so long as the contact of the materials is ensured. For example, it may be carried out by passing the organic solvent through a column filled with $TiCl_2Pc$ and/or $TiBr_2Pc$; however it is preferably carried out by mixing them in an agitation vessel. When the contact is carried out with an organic solvent containing no oxygen atom in the molecular structure such as aniline in the absence of oxygen, for example, in nitrogen atmosphere, the TiOPc crystals can not be produced. Therefore, the contact with such type of the solvent should be carried out in an oxygen-containing atmosphere such as in the air. On the other hand, when the contact is carried out with an organic solvent containing oxygen as the most of the solvents suitable for the invention, the TiOPc crystals can be produced in the absence of oxygen. Consequently, it is preferred that the contact is carried out in the air regardless of the type of the solvent from the viewpoint of the process economy.

As described above, D-type TiOPc may be produced by using the non-substituted phenols in association with water. That is, it can be produced by contacting $TiCl_2Pc$ and/or $TiBr_2Pc$ a) with the non-substituted phenols containing water, or b) with the non-substituted phenols and subsequently with water.

The conditions for the contact of the $TiCl_2Pc$ and/or $TiBr_2Pc$ with the non-substituted phenols containing water in the method a) above or with the non-substituted phenols in the method b) above may be similar to those used for the contact with the other organic solvents. The weight ratio of the phenols to water in the mixture of phenols and water is preferably selected from the range of 1:0.01 to 1:100, particularly 1:0.05 to 1:50.

The conditions for the contact with water in the method b) above are not also particularly limited; however, it is preferably carried out by adding water to the intermediate product obtained from the treatment of $TiCl_2Pc$ and/or $TiBr_2Pc$ with the phenols and mixing them by mechanical agitation. The amount of water to be added may be generally 5 to 200 times, particularly, 10 to 100 times by weight of the intermediate product, and the temperature for the treatment is generally selected from the range of 20° to 100° C., preferably 50° to 100° C. The duration for the treatment may vary depending on the temperature. For example, it is generally carried out for 0.5 to 3 hours at the temperature of 100° C.

The methods a) and b) above may be variably modified insofar as the production of TiOPc crystals, the purpose of the present invention, is ensured. For example, it may be modified by supplementing other pre- and/or aftertreatments as well as optional treatments in the midst of the process or by using the non-substituted phenols mixed with a material other than water such as aromatic hydrocarbons.

Such possible and preferred modifications of the process include:

1) $TiCl_2Pc$ and/or $TiBr_2Pc$ are contacted with the non-substituted phenols, water and a mixture of aromatic hydrocarbon and water successively, 2) $TiCl_2Pc$ and/or $TiBr_2Pc$ are contacted with the non-substituted phenols and subsequently with a mixture of aromatic hydrocarbon and water, and 3) $TiCl_2Pc$ and/or $TiBr_2Pc$ are contacted with the non-substituted phenols containing water and subsequently with a mixture of aromatic hydrocarbon and water.

The use of the non-substituted phenols containing water enables the easier recovery of the obtained TiOPc as compared with the case using the non-substituted phenol alone since TiOPc shows poor solubility in water.

The weight ratio of the aromatic hydrocarbon to water in the mixture of them may be selected from the range of 1:0.5 to 1:200, preferably 1:1 to 1:100. Though the weight ratio of the intermediate and the mixture of the aromatic hydrocarbon and water is not particularly limited, it is generally selected from the range of 1:5 to 1:200, preferably 1:10 to 1:100. The treatment temperature may be 20° to 100° C., preferably 50° to 100° C., and the treatment duration may be preferably 0.1 to 3 hours. The type of the aromatic hydrocarbon is not also particularly limited and it may have substituents such as halogen in the molecular structure thereof; however, it is preferably a solvent having a melting point of not more than 100° C. for the ease of mixing with water.

It is noted that the successive or subsequent contact is carried out either continuously or after the solvent used in the front step is removed.

As described above, the novel process for the preparation of TiOPc according to the present invention enables to selectively produce TiOPc having a desired specific crystalline form by an extremely simple process as compared with any prior method, and therefore it is extremely advantageous for the production of TiOPc in an industrial scale.

EXAMPLES

This invention is further illustrated more specifically by referring to the following Examples, but they do not limit the scope of the invention since the scope of the invention is defined by the appended claims.

Synthesis of $TiCl_2Pc$

Into a 2-liter reaction flask equipped with a thermometer, agitator and reflux condenser, 184 g (0.718 moles) of o-phthalodinitrile and 1,200 ml of α-chloronaphthalene were introduced, added with 40 ml (0.364 moles) of titanium tetrachloride under agitation and heated to 200° C. to react for 5 hours. After cooling the reaction mixture to 120° C., it was filtered while it was hot to obtain a crude cake of $TiCl_2Pc$, which was washed with 1,000 ml of α-chloronaphthalene to obtain a blue wet cake of crude $TiCl_2Pc$ weighing 224 g.

The result of the elemental analysis of the product (in dry state) is shown below.

|  | C | H | N | Cl |
|---|---|---|---|---|
| Calcd. % | 60.88 | 2.55 | 17.75 | 11.23 |
| Anal. % | 60.66 | 2.37 | 17.68 | 11.08 |

EXAMPLE 1

Into a 200-ml reaction flask equipped with a thermometer, agitator and reflux condenser, 11.2 g of $TiCl_2Pc$ wet cake and 150 ml of N-methylpyrrolidone were introduced, heated to 140° C. and maintained at the temperature under agitation for 2 hours. After cooling the reaction mixture to 80° C., it was filtered to obtain a cake, which was washed with methanol and dried to obtain 7.2 g of blue powder of A-type TiOPc. Yield: 70% (based on the starting o-phthalodinitrile).

The X-ray diffraction spectrum of the obtained TiOPc in powder form is shown as FIG. 1.

EXAMPLES 2 TO 26 AND COMPARATIVE EXAMPLES 1 TO 3

TiOPc's were produced by repeating the procedure of Example 1 using various organic solvents and treatment conditions.

The organic solvents and the treatment conditions employed and the results are summarized in Table 3 below.

TABLE 3

| Example No. | Organic solvent | Treatment conditions Temperature (°C.) | Duration (hr) | Product (TiOPc) Yield (g) | Crystal form |
|---|---|---|---|---|---|
| 2 | $CH_3(CH_2)_2CHO$ | 76 | 3 | 8.2 | B |
| 3 | 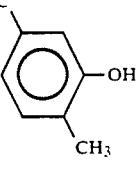 | 130 | 2 | 6.8 | C |
| 4 | $\begin{array}{c} CH_2-CH_2CH_2 \\ \vert \qquad\quad \vert \\ CO-\!\!-\!\!-N-CH_3 \end{array}$ | 120 | 3 | 7.7 | A |

TABLE 3-continued
| Example No. | Organic solvent | Treatment conditions Temperature (°C.) | Duration (hr) | Product (TiOPc) Yield (g) | Crystal form |
|---|---|---|---|---|---|
| 5 | 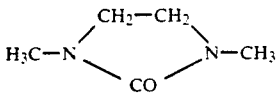 | 150 | 1 | 7.1 | A |
| 6 | 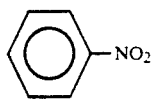 | 150 | 2 | 7.2 | A |
| 7 |  | 140 | 2 | 6.8 | A |
| 8 | 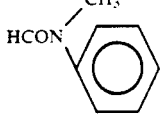 | 140 | 2 | 6.6 | A |
| 9 | 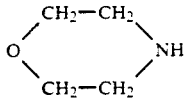 | 120 | 2.5 | 7.8 | A |
| 10 | 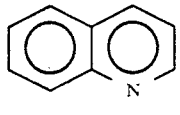 | 140 | 2 | 6.9 | A |
| 11 | 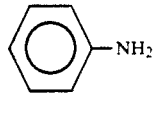 | 140 | 2 | 7.1 | A |
| 12 | 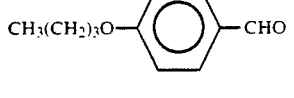 | 140 | 2 | 7.2 | B |
| 13 | $CH_3CO(CH_2)_2COCH_3$ | 140 | 2 | 7.5 | B |
| 14 | 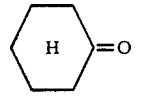 | 140 | 2 | 7.1 | B |
| 15 | 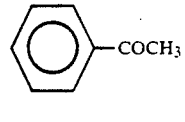 | 130 | 2 | 7.7 | B |
| 16 | 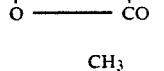 | 130 | 2 | 7.2 | B |
| 17 | 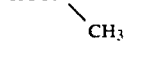 | 130 | 2 | 7.1 | B |

TABLE 3-continued

| Example No. | Organic solvent | | Treatment conditions Temperature (°C.) | Duration (hr) | Product (TiOPc) Yield (g) | Crystal form |
|---|---|---|---|---|---|---|
| 18 | CH₃CON(CH₃)₂ (N,N-dimethylacetamide) | | 130 | 2 | 7.2 | B |
| 19 | CNCH₂CN | | 130 | 2 | 7.4 | B |
| 20 | C₆H₅-NH-C₂H₅ (N-ethylaniline) | | 130 | 2 | 7.3 | B |
| 21 | (CH₃)₂SO | | 140 | 2 | 7.5 | B |
| 22 | caprolactam (CH₂-CH₂-CH₂-CH₂-CH₂-CO-NH ring) | 150 g | 130 | 2 | 8.1 | B |
|    | (CH₃OCH₂CH₂)₂O | 75 ml | | | | |
| 23 | H₃CO-C₆H₄-OH | 150 g | 130 | 2 | 7.2 | B |
|    | (CH₃OCH₂CH₂)₂O | 75 ml | | | | |
| 24 | (CH₃)₃CCH₂C(CH₃)₂-C₆H₄-OH | 150 g | 130 | 2 | 7.3 | B |
|    | (CH₃OCH₂CH₂)₂O | 75 ml | | | | |
| 25 | HO-C₆H₄-C(CH₃)₂-C₆H₄-OH | 150 g | 130 | 2 | 7.0 | B |
|    | (CH₃OCH₂CH₂)₂O | 75 ml | | | | |
| 26 | H₂N-C₆H₄-OH | 150 g | 130 | 2 | 7.8 | B |
|    | (CH₃OCH₂CH₂)₂O | 50 ml | | | | |
| Comparative Example 1 | C₆H₅-CH₃ | | 110 | 5 | No production of TiOPc | |
| Comparative Example | (CH₃OCH₂CH₂)₂O | | 140 | 4 | No production of TiOPc | |
| Comparative Example | H₅C₂OOC(CH₂)₄COOC₂H₅ | | 140 | 4 | No production of TiOPc | |

Figure 2:
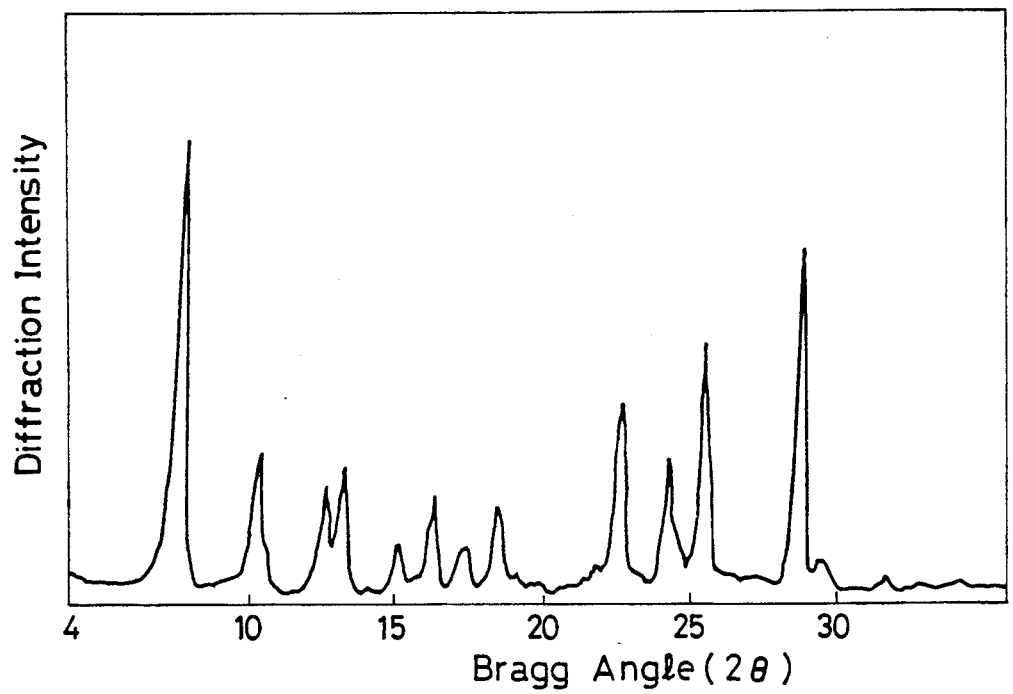
Figure 3:
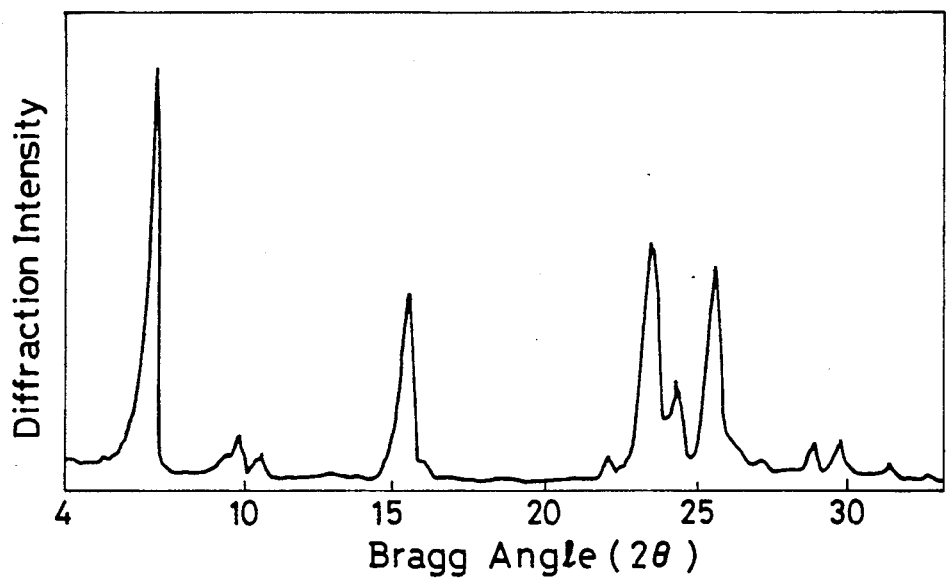

The X-ray diffraction spectra of TiOPc's obtained in Examples 2 and 3 are shown as FIGS. 2 and 3, respectively.

EXAMPLE 27

Into a 1-liter reaction flask equipped with a thermometer, agitator and reflux condenser, 110 g of wet cake of TiCl₂Pc obtained as same as above and 600 ml n-butanol were introduced and refluxed at 118° C. under agitation for 2 hours to obtain 75 g (dry weight) of blue crystals of B-type TiOPc. Yield: 73% (based on the starting o-phthalodinitrile).

Figure 4:
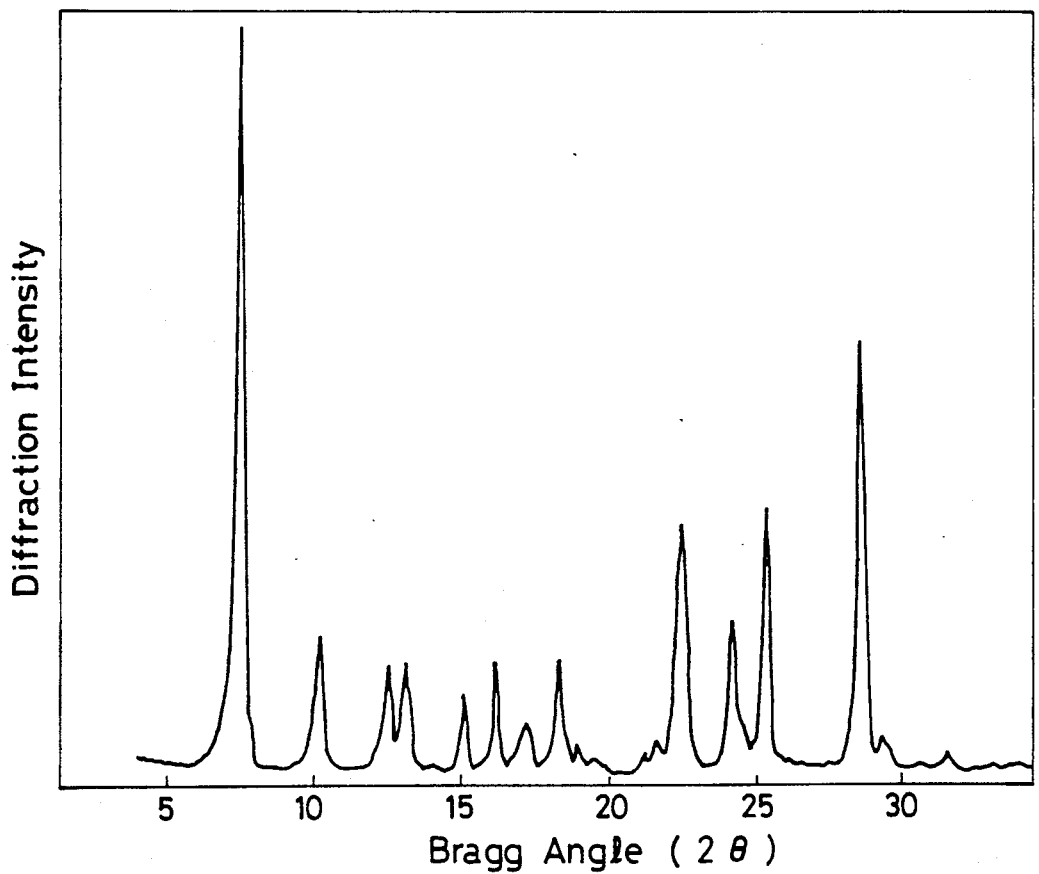

The product showed characteristic diffraction peaks at Bragg angles (2θ±0.2°) of 7.6°, 10.2°, 22.3°, 25.3° and 28.6° in the X-ray diffraction spectrum thereof shown as FIG. 4.

The result of the elemental analysis of the product is shown below.

|  | C | H | N |
|---|---|---|---|
| Calcd. % | 66.68 | 2.80 | 19.44 |
| Anal. % | 66.40 | 2.59 | 19.23 |

EXAMPLES 28 TO 32 AND COMPARATIVE EXAMPLES 4 AND 5

TiOPc's were produced by repeating the procedure of Example 27 using the various alcohols and the reaction conditions indicated in Table 4 below.

The results are also shown in Table 4.

TABLE 4

Figure 5:
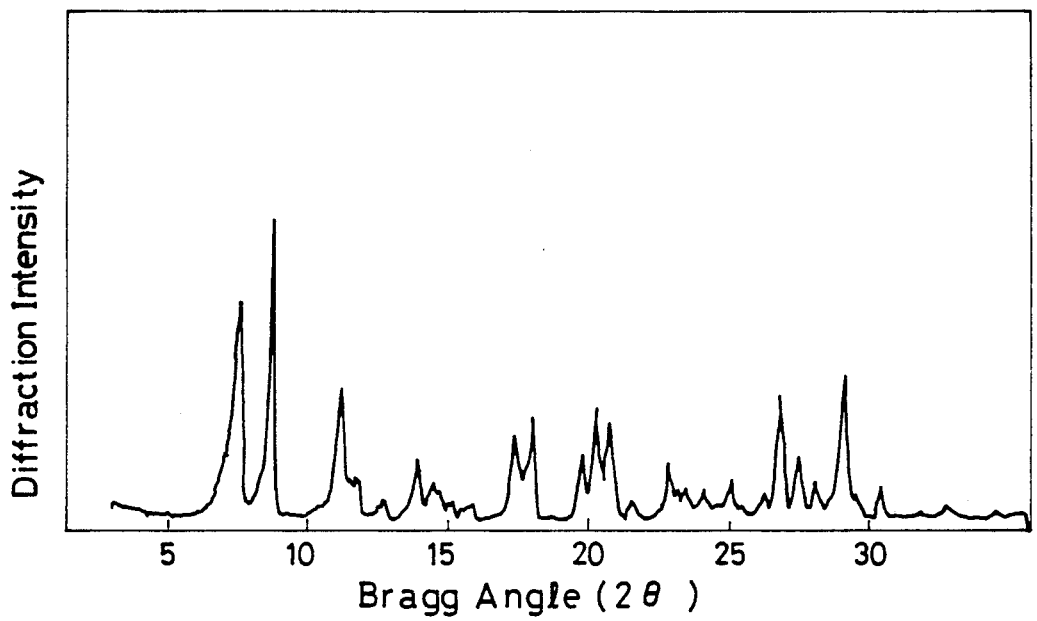
FIG. 5 and FIG. 6 are the X-ray diffraction spectra obtained for the products in powder form obtained in Comparative Examples 4 and 5, respectively.
Figure 6:
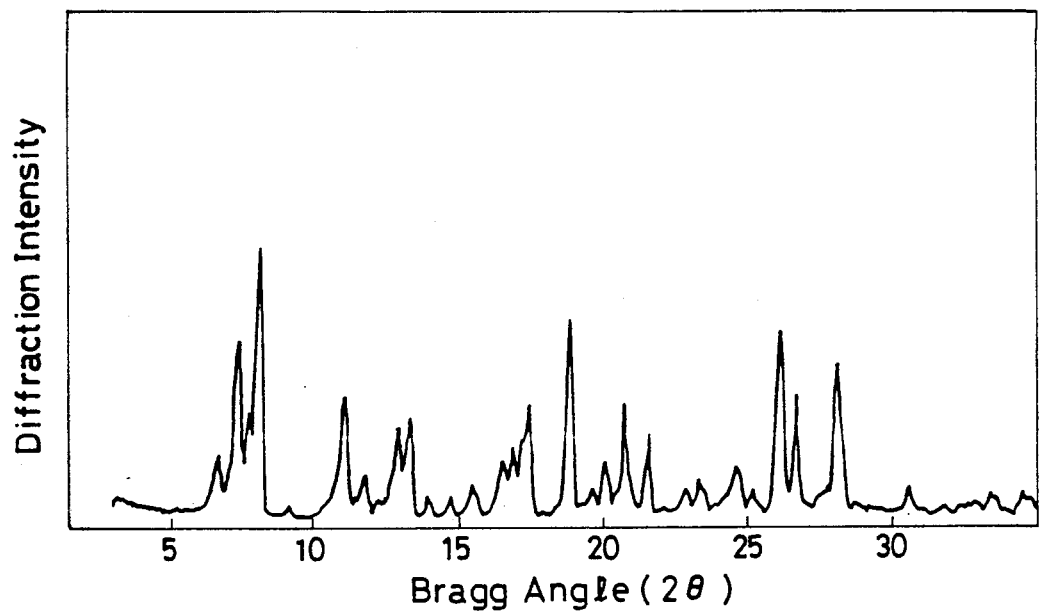

| Example No. | Alcohol | Treatment conditions | | Product (TiOPc) | |
|---|---|---|---|---|---|
| | | Temperature (°C.) | Duration (hr) | Yield (g) | Diffraction Spectrum* |
| 28 | $(CH_3)_3COH$ | 82 | 3 | 78 | Similar to FIG. 4 |
| 29 | $CH_3(CH_2)_4OH$ | 138 | 2 | 77 | Similar to FIG. 4 |
| 30 | $CH_3(CH_2)_3CH(C_2H_5)CHOH$ | 150 | 2 | 71 | Similar to FIG. 4 |
| 31 | C₆H₅—(CH₂)₂OH | 150 | 2 | 67 | Similar to FIG. 4 |
| 32 | cyclohexyl—OH | 150 | 2 | 73 | Similar to FIG. 4 |
| Comparative Example 4 | $CH_3OH$ | 65 | 5 | 84 | FIG. 5 |
| Comparative Example 5 | $(CH_3)_2CHOH$ | 82 | 3 | 81 | FIG. 6 |

*X-ray diffraction spectra of the products in powder form

Judging from the X-ray diffraction spectra, the product of Comparative Example 4 is considered to be mainly composed of $TiCl_2Pc$, and the product of Comparative Example 5 is considered to be composed of TiOPc containing two or more crystalline forms.

EXAMPLE 33

Into a 200-ml Erlenmeyer flask, 11.2 g of wet cake of $TiCl_2Pc$ obtained as same as above and 150 g of phenol were introduced, heated to 110° C. and maintained at the temperature under agitation for 5 hours. Then the resulted product was taken by filtration at 50° C. and washed with 100 ml of methanol. The obtained cake was added with 100 ml of water, agitated for 1 hour at 90° to 100° C. and taken by filtration. Then, the product was added with 20 ml of o-dichlorobenzene and 150 ml of water and agitated for 1 hour at 60° C. After removing the aqueous layer, the organic layer was washed with methanol and dried to obtained 6.2 g of blue D-type TiOPc powder.

The result of the elemental analysis of the product is shown below.

|  | C | H | N |
|---|---|---|---|
| Calcd. % | 66.68 | 2.80 | 19.44 |
| Anal. % | 66.88 | 2.81 | 19.61 |

Figure 7:
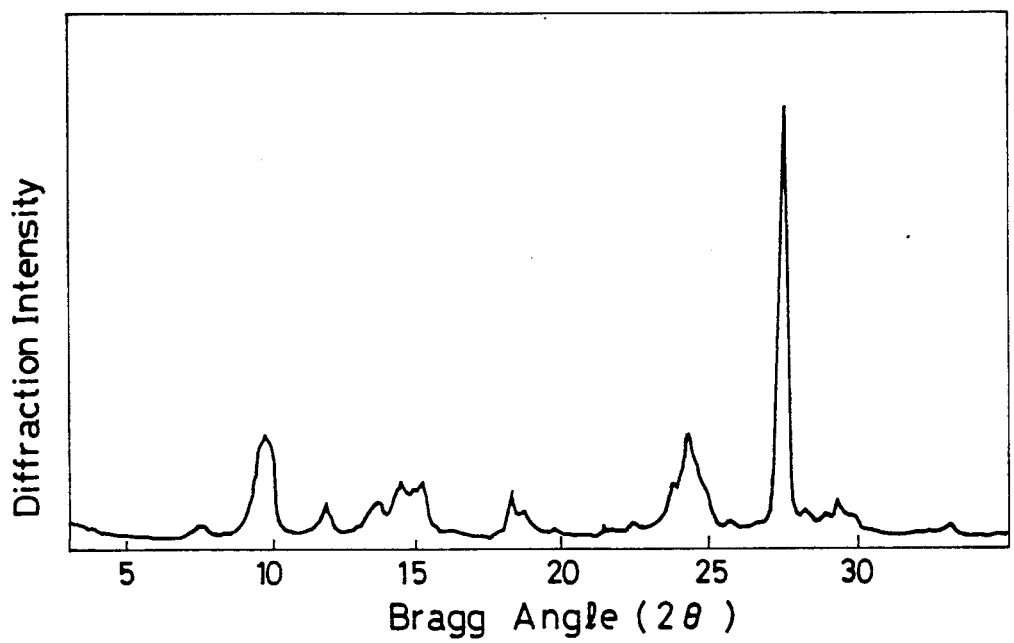
FIGS. 7 to 9 are the X-ray diffraction spectra obtained for the crystalline TiOPc's in powder form produced in Examples 33, 34 and 37, respectively.

The X-ray diffraction spectrum of the product in powder form is shown as FIG. 7.

EXAMPLE 34

The procedure of Example 33 was repeated except that the treatment with the mixture of o-dichlorobenzene and water was omitted to obtain 6.4 g of blue D-type TiOPc powder.

The result of the elemental analysis of the product is shown below.

|  | C | H | N |
|---|---|---|---|
| Calcd. % | 66.68 | 2.80 | 19.44 |
| Anal. % | 66.49 | 2.83 | 19.31 |

Figure 8:
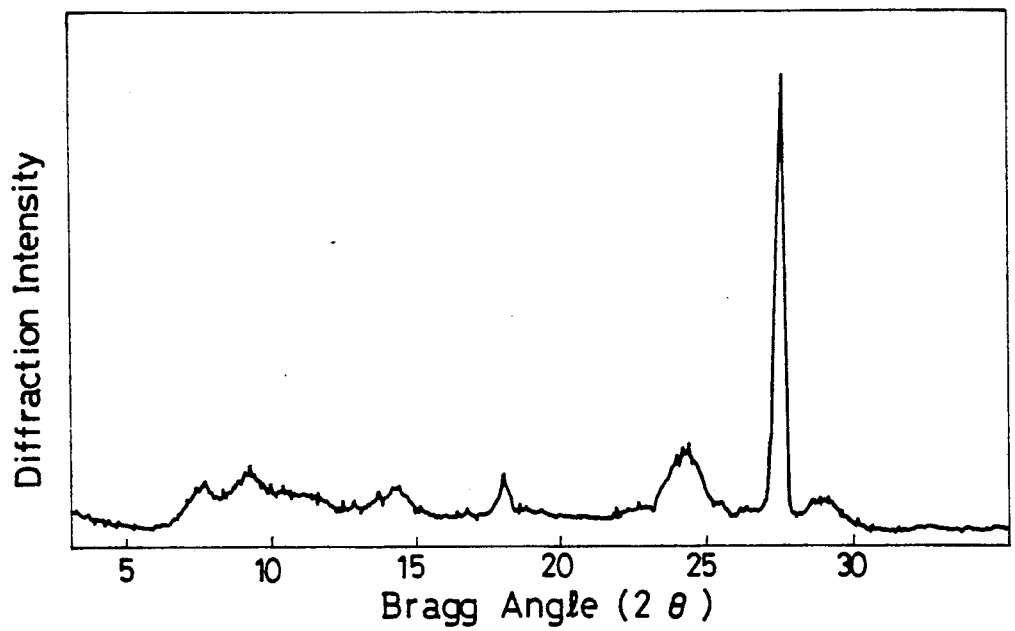

The X-ray diffraction spectrum of the product in powder form is shown as FIG. 8.

EXAMPLE 35

The procedure of Example 33 was repeated except that the treatment with water was omitted to obtain 6.5 g of blue D-type TiOPc powder.

The result of the elemental analysis of the product is shown below.

|  | C | H | N |
|---|---|---|---|
| Calcd. % | 66.68 | 2.80 | 19.44 |
| Anal. % | 66.67 | 2.83 | 19.41 |

The X-ray diffraction spectrum of the product in powder form was similar to that of the product of Example 33.

EXAMPLE 36

The procedure of Example 33 was repeated except that the phenol was replaced by phenol containing 10% of water and that the treatment with water was omitted to obtain 7.0 g of blue D-type TiOPc powder.

The result of the elemental analysis of the product is shown below.

|  | C | H | N |
|---|---|---|---|
| Calcd. % | 66.68 | 2.80 | 19.44 |
| Anal. % | 66.50 | 2.69 | 19.29 |

The X-ray diffraction spectrum of the product in powder form was similar to that of the product of Example 33.

EXAMPLE 37

The procedure of Example 33 was repeated except that the phenol was replaced by phenol containing 20% of water and that the treatment with the mixture of water and the aromatic compound was omitted to obtain 7.2 g of blue D-type TiOPc crystals.

The result of the elemental analysis of the product is shown below.

|  | C | H | N |
|---|---|---|---|
| Calcd. % | 66.68 | 2.80 | 19.44 |
| Anal. % | 66.51 | 2.70 | 19.26 |

Figure 9:
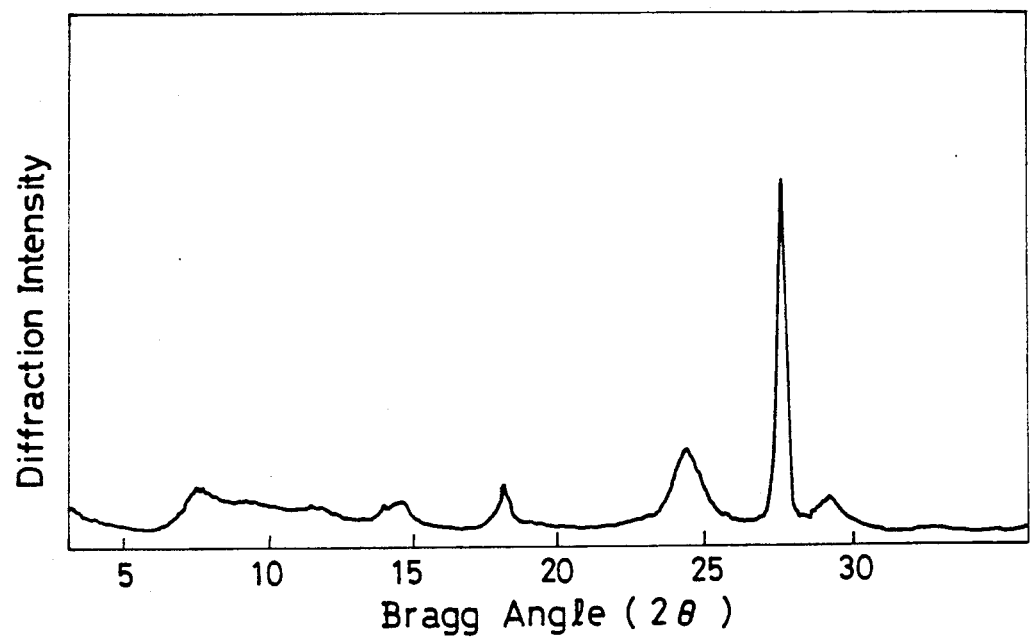

The X-ray diffraction spectrum of the product in powder form is shown as FIG. 9.

EXAMPLES 38 TO 43 AND COMPARATIVE EXAMPLE 6

TiOPc's were produced by repeating the procedure of Example 33 except that the various phenols and aromatic compounds shown in Table 5 below were used and that the reaction conditions were varied as indicated in the same.

The results are also shown in Table 5.

TABLE 5

| Example No. | Phenol | Treatment conditions Temperature (°C.) | Duration (hr) | Aromatic Hydrocarbon | Product (TiOPc) Yield (%) | Crystal form |
|---|---|---|---|---|---|---|
| 38 | phenol-OH added with 40 g of $(CH_3OCH_2CH_2)_2O$ | 130 | 3 | toluene (C$_6$H$_5$-CH$_3$) | 6.8 | D |
| 39 | resorcinol (HO-C$_6$H$_4$-OH, 1,3) added with 60 g of $(CH_3OCH_2CH_2)_2O$ | 140 | 2 | chlorobenzene (C$_6$H$_5$-Cl) | 7.1 | D |
| 40 | resorcinol added with 60 g of $(CH_3OCH_2CH_2)_2O$ | 110 | 5 | p-xylene (H$_3$C-C$_6$H$_4$-CH$_3$) | 7.3 | D |
| 41* | resorcinol added with 30 g of H$_2$O | 110 | 5 | toluene (C$_6$H$_5$-CH$_3$) | 7.2 | D |
| 42 | hydroquinone (HO-C$_6$H$_4$-OH, 1,4) added with 75 g of $(CH_3OCH_2CH_2)_2O$ | 130 | 3 | o-dichlorobenzene (C$_6$H$_4$(Cl)$_2$) | 6.9 | D |

TABLE 5-continued

| Example No. | Phenol | Treatment conditions Temperature (°C.) | Duration (hr) | Aromatic Hydrocarbon | Product (TiOPc) Yield (%) | Crystal form |
|---|---|---|---|---|---|---|
| 43 | HO—⟨◯⟩—OH added with 75 g of $(CH_3OCH_2CH_2)_2O$ | 130 | 3 | ⟨◯⟩—$C_2H_5$ | 6.6 | D |
| Comparative Example 6 | $(CH_3OCH_2CH_2)_2O$ 150 g | 130 | 3 | ⟨◯⟩ with Cl, Cl | No production of TiOPc | |

*The treatment with water was ommited in Example 41

What is claimed is:

1. A process for the preparation of crystalline oxytitanium phthalocyanine showing A, B or C crystalline form consisting of contacting dichlorotitanium phthalocyanine, dibromotitanium phthalocyanine or a mixture of them with at least one organic solvent selected from the group consisting of aromatic nitro compounds, nitrogen-containing cyclic ethers, aromatic amines, alcohols containing not less than 4 carbon atoms, aldehydes, ketones, lactones, lactams, acid amides, nitriles, alkyl sulfoxides and substituted phenols to produce the crystalline oxytitanium phthalocyanine.

2. The process as defined in claim 1, wherein the starting material is dichlorotitanium phthalocyanine.

3. The process as defined in claim 1, wherein the starting material is dichlorotitanium phthalocyanine, dibromotitanium phthalocyanine or a mixture of them obtained by the reaction of o-phthalodinitrile with titanium tetrachloride, titanium tetrabromide or a mixture of them.

4. The process as defined in claim 1, wherein the contact of dichlorotitanium phthalocyanine, dibromotitanium phthalocyanine or a mixture of them with the solvent is carried out by mixing them under agitation.

5. The process as defined in claim 1, wherein dichlorotitanium phthalocyanine, dibromotitanium phthalocyanine or a mixture of them is contacted with the solvent at a temperature of from 50° to 200° C.

6. The process as defined in claim 1, wherein the contact is carried out in a weight ratio of dichlorotitanium phthalocyanine, dibromotitanium phthalocyanine or a mixture of them to the organic solvent of from 1:5 to 1:100.

7. The process as defined in claim 1, wherein dichlorotitanium phthalocyanine, dibromotitanium phthalocyanine, or a mixture of them is contacted with at least one solvent selected from the group consisting of N-alkyllactams, aromatic nitro compounds, halogenated phenols, aromatic acid amides, nitrogen-containing cyclic ethers and aromatic primary amines.

8. The process as defined in claim 1, wherein dichlorotitanium phthalocyanine, dibromotitanium phthalocyanine or a mixture of them is contacted with at least one solvent selected from the group consisting of alcohols containing not less than 4 carbon atoms, aldehydes, ketones, lactones, lactams (other than N-alkyllactams), non-aromatic acid amides, substituted phenols (other than halogenated phenols), nitriles, N-alkyl substituted anilines and alkyl sulfoxides.

9. The process as defined in claim 1, wherein the crystalline oxytitanium phthalocyanine is further treated with a solvent.

10. The process as defined in claim 1, wherein the crystalline oxytitanium phthalocyanine is washed.

11. The process as defined in claim 1, wherein the crystalline oxytitanium phthalocyanine is filtered.

12. The process as defined in claim 11, wherein the filtered crystalline oxytitanium phthalocyanine is further treated with a solvent.

13. The process as defined in claim 11, wherein the filtered crystalline oxytitanium phthalocyanine is washed.

14. The process as defined in claim 1, wherein the contact is carried out in the air.

* * * * *